United States Patent Office 3,822,214
Patented July 2, 1974

3,822,214
PLASTIC ORNAMENT AND COMPOSITION FOR FORMING THE SAME
Charles W. Juby, 901 Washington St.,
Wilmington, Del. 19801
No Drawing. Filed Feb. 29, 1972, Ser. No. 230,488
Int. Cl. C09k 1/02
U.S. Cl. 252—301.3 R
3 Claims

ABSTRACT OF THE DISCLOSURE

A plastic ornament in the form of a luminescent reflector which glows in the dark and may be directly placed in contact with a light bulb without plastic deformation from the heat generated therein is disclosed. The chemical composition which gives this article these properties is comprised of (a) from 75–85 parts by weight of a high heat resistant polystyrene, (b) from 3 to 5 parts by weight of a 1:1 butadiene styrene copolymer, (c) from 5 to 8 parts by weight of a mixture of 99.99 parts zinc sulfide and from about 100 to 200 parts per million of copper sulfide and (d) from about 5 to 15 parts by weight of either a monophosphonium halide of the formula:

I 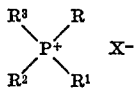

wherein R, $R^1$, $R^2$ and $R^3$ are lower alkyl groups or alkenyl, cyano, hydroxy, carboxy substituted alkyl, aryl, aralkyl, imidazolyl, vinyl, halo, polyhalo, nitro substituted aralkyl, dialkylaminoalkyl, carboalkoxyalkyl, carboxyalkenyl, carboxalkoxyalkenyl, and X is bromine, chlorine or iodine or a diphosphonium halide of the formula:

II 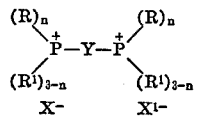

wherein R and $R^1$ represents a radical such as aryl, alkyl, cyano, hydroxy substituted alkyl, or alkenyl, Y represents an alkylene radical, or an arylene, an unsaturated alkylene radical, or an oxoalkylene radical and X and $X^1$ each represent a bromine, chlorine or iodine radical, either alone or admixed with an equal part of hexabromobenzene.

BACKGROUND OF THE INVENTION

For many years, Christmas tree light bulb reflectors have been widely employed to enhance and improve the beauty of the ornamentation and lighting effects of Christmas tree lights. With conventional metal reflectors, however, these tend to become hot because of the heat generated from the light bulb to which they are attached. A second drawback is that they are obviously opaque and reflect light forward only. A third drawback is that because they are metallic and opaque, it is not possible to generate controllable front and back passage of light through the reflector when the light is on and a phosphorescent glow when the tree light bulb is extinguished or turned off.

The primary reason that plastic light reflectors have not been used is that if they are in direct contact with the heat from the light bulb, they being thermoplastic, will melt and deform eventually. This heat collection becomes even more magnified if the thermoplastic resin is pattern impregnated with a metal salt which is required to generate the phosphorescent effect. The metal will normally be expected to act as a "heat sink" and build up a specific heat in the object and thus, accelerate thermal deformation thereof. It would amount to a substantial advance and improvement in the art to disclose a way of manufacturing a low cost translucent thermoplastic light bulb reflector which will not melt, deform or even heat up and will permit the incorporation of phosphorescent metal salts without losing this characteristic.

It is an object of the present invention, therefore, to disclose a resinous composition of matter which can be employed as a molding powder to form such luminescent light reflectors by vacuum forming or other conventional techniques.

THE INVENTION

A new and unique resinous composition and formed light reflector is the subject matter of the present discovery which is the basis of the invention sought to be patented. This composition is comprised of the following materials:

(A) From about 75 to 85 parts by weight of a high heat resistant polystyrene having a melt viscosity in poises of 3,000–4,000 and a deflection temperature of about 214° F. at a pressure of 264 lbs. f./in.² and a Vicat softening point of about 224° F.

(B) From about 3 to 5 parts by weight of a modifying resin component for the polystyrene (A) which modifier consists of a 1 to 1 ratio copolymer blend of a butadiene styrene resin which is blended in with the other ingredients in the molding powder.

(C) From 5 to 8 parts by weight of a phosphorescent metal salt such as zinc sulfide which is incorporated into the resin by careful admixture with the molding powder.

(D) From about 5 to 15 parts by weight of a phosphonium halide salt of the formula I or II. The monophosphonium halide is preferably one selected from those having the general formula:

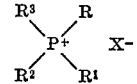

wherein R, $R^1$, $R^2$, $R^3$ are lower alkyl groups or alkenyl, cyano, hydroxy, carboxy substituted alkyl, aryl, aralkyl, imidazolyl, vinyl, halo, polyhalo, nitro substituted aralkyl, dialkylaminoalkyl, carboalkoxyalkyl, carboxyalkenyl, carboxyalkoxyalkenyl, and X is either chlorine, bromine or iodine or

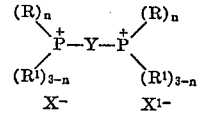

wherein R and $R^1$ represent a radical such as aryl, alkyl, cyano, hydroxy substituted alkyl, alkenyl; Y represents an alkylene radical or arylene, an unsaturated alkylene radical or an oxoalkylene radical and X and $X^1$ each represent a bromine, chlorine or iodine radical, either alone or in admixture with an equal amount of hexabromobenzene.

When the aforesaid ingredients (A) (B), (C) and (D) are admixed within the range of proportions indicated, a composition useable for vacuum forming a light bulb reflector having luminescent properties and at the same time thermal resistance in spite of its high thermally conductive metallic content is obtained. While the metal particles needed to impart phosphorescent effect to the formed resinous receptable do act as a heat sink, the presence of monophosphonium halide salts either alone or in admixture with hexabromobenzene will, in the proper ratio to the metal luminescent particles, prevent the heat buildup and/or any problem of flammability of the light reflector or ornament.

A preferred composition within the general concept of the invention is a molding composition wherein the phosphorescent metal salt (C) is present in amount of 7.5 parts by weight of the total composition, and the phosphonium halide salt (D) in equal admixture with hexabromobenzene is present in amount of 10 parts by weight of the total composition. The balance of the molding powder is the polystyrene resin and copolymer of polystyrene and butadiene.

While a large range of proportions of the polystyrene resins is permitted in the instant composition, the relative amounts of phosphorescent metal salt and phosphonium halide are and have been found to be critical to the success of the invention. For example, at a level of 5 parts by weight of the phosphorescent metal salt, at least 5 parts by weight of the phosphonium halide must be present to prevent heat breakdown and flammability of the formed article. To obtain the needed luminescence, however, there must be present at least 5 parts by weight of the phosphorescent metal salt in the article. This dictates the level of phosphonium halide salt which must be present in the composition to obtain the novel and unique heat and flame resistance which goes to the heart of my discovery.

If there is not at least 5 parts by weight of the phosphonium halide salt to each 5 parts by weight of phosphorescent salt, then the product loses its heat stability and flame resistance. A blend which contains 10 parts by weight of phosporescent salt and 5 parts by weight of the phosphonium halide will not have both luminescence and heat stability and flame retardance. On the other hand, a resin blend which has 7.5 parts by weight of the phosphorescent salt such as zinc sulfide and 10 parts by weight of the phosphonium halide will demonstrate both excellent luminescence and flame retardance.

While the preferred thermoplastic resin employed in the practice of this invention is high, heat polystyrene blended with a moiety of a styrene-butadiene copolymer to give additional resiliency to the vacuum formed article, it is within the broad concept of the invention to include other resins such as polyethylene, methyl methacrylate, cellulose acetate, polypropylene, vinyl chloride and vinyl acetate and copolymers of these vinyl fluoride and the like from the thermoplastic resin group as well as thermosetting materials such as cast phenolics, urea-formaldehyde and melamine formaldehyde as well as polyester resins.

Furthermore, while the problem of obtaining a resinous material which will phosphoresce and at the same time resist heat is particular to Christmas tree light bulb reflectors, this is by no means the only application or use where this unique combination of properties is or can be important. On any plastic construction such as illuminated signs where these properties become important, this discovery would be of great value. In plastic panels or cast sheets of resinous material which are intended to carry phosphorescent messages but are exposed to strong heat and sunlight, this would become important because it would permit the use of much larger concentrations of phosphorescent pigment in the resinous mix and still permit the manufacturers of such signs to meet the fire underwriters code on flame retardance.

The practice of the present invention will be concretely illustrated by the following illustrative example of the blending of the composition of the present invention and its extrusion into a cast sheet of material. This sheet then has art or lithographic work performed thereon and is then vacuum formed into the shape desired. It must be understood that the specific example is not in any way intended to limit the present invention and the scope of this concept is much broader than the cited example.

EXAMPLE

Into a Banbury mixer there is added 78 parts by weight of a high heat resistance polystyrene resin molding powder having a melt viscosity of 3000–4000 centipoises (average 3200 centipoises), a deflection temperature of 214° F. at 264 p.s.i. and a softening point of 224° F. known commercially as Styron 685® which is manufactured by the Dow Chemical Company, Midland, Mich., 3 parts of a 1:1 copolymeric blend of butadiene-styrene resin having a melt viscosity of 3000 poises, 10 parts of an equal mixture of one part of triphenylmethylphosphonium bromide of the type disclosed and prepared in the manner described in U.S. Pat. 3,530,164 to Gillham et al. and one part of hexabromobenzene. To this combination of ingredients there is added 7.5 parts of a phosphorescent zinc sulfide pigment known commercially as Helecon® 2330 manufactured by the United States Radium Corporation, Morristown, N.J., and the entire mixture is thoroughly milled and mixed for 40 minutes. At the end of this time, the mixture is molded by conventional techniques of extrusion into a sheet 6" in width and 0.045" in thickness. The extruded sheet when cooled is subjected to ASTM test D-635-56T which tests the sample for heat and flame resistance.

After being cleared for heat stability, the extruded sheet of luminescent plastic is lithographed with various designs and then subjected to conventional vacuum forming techniques to shape and cut it into a reflector for a Christmas tree light or other bulb. When tested by exposure to normal 6.0 watt light source, the polystyrene modified reflector will glow for from 10 and 12 hours after the light source has been extinguished. Because of the high concentration of phosphorescent pigment, the intensity of the glow from both sides of the receptacle is substantial.

As an alternative aspect of our invention, the luminescent pigment of the invention noted in the example may be replaced by or admixed with a fluorescent pigment in the same of somewhat lesser amount (2% less generally) than the phosphorescent pigments. A particularly suitable fluorescent pigment is Helecon 2210 which is a daylight color of light green and a fluorescent color of green, an average particle size of 3.5 microns and a response to ultraviolet light at 3650 Angstroms which is classified as good. When these fluorescent pigments are admixed with phosphorescent materials at 1:1 blend ratio, should prove satisfactory for Christmas tree ornaments which glow in the light and in the dark as well.

What is claimed is:

1. A resinous powder composition for molding a heat stable luminescent light reflector which comprises:

2. A composition according to claim 1 wherein the luminescent metal salt is zinc sulfide.

3. A resinous composition according to claim 1 wherein the (a) polystyrene resin is 78 parts by weight, the (b) butadiene-styrene copolymer is 3 to 5 parts by weight, (c) the luminescent metal salt is 7.5 parts by weight, and the (d) phosphonium halide is 10 parts by weight.

(a) from 75 to 85 parts by weight of a high heat resistance polystyrene resin having a melt viscosity of 3000–4000 poises, and a vicat softening point of about 224° F.;

(b) from 3 to 5 parts by weight of a 1:1 ratio copolymer blend of a butadiene-styrene resin, which acts as a modifier for polystyrene component;

(c) from 5 to 8 parts by weight of a phosphorescent metal sulfide salt; and (d) from 5 to 15 parts by weight of a phosphonium halide of the formula:

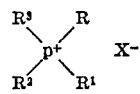

wherein R, $R^1$, $R^2$ and $R^3$ are selected from the group consisting of lower alkyl groups, or alkenyl, cyano, hydroxy, carboxy substituted alkyl, aryl, aralkyl, imidazolyl, vinyl, halo, polyhalo, nitro substituted aralkyl, dialkylaminoalkyl, carboalkoxyalkyl, carboxyalkenyl carboxyalkoxyalkenyl and X is either chlorine, bromine or iodine or

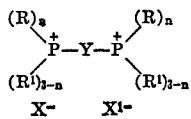

wherein R and R¹ are selected from the group consisting of aryl, alkyl, cyano, hydroxy substituted alkyl or alkenyl, Y represents a function selected from the group consisting of an alkylene radical an arylene radical, an unsaturated alkylene radical or an oxoalkylene radical and X and X¹ each represent a member selected from the group consisting of bromine, chlorine, or iodine and mixtures of the phosphonium halide with hexabromobenzene and $n$ is 1 to 3 and wherein at least an equal amount of components (c) and (d) are present in the composition.

References Cited
UNITED STATES PATENTS

| | | | |
|---|---|---|---|
| 3,565,815 | 2/1971 | Christy | 252—301.3 R |
| 3,654,342 | 4/1972 | Gillham et al. | 260—45.7 P |

DANIEL E. WYNAN, Primary Examiner

A. P. DEMERS, Assistant Examiner

U.S. Cl. X.R.

240—10; 250—77; 260—45.7 P